United States Patent
Xin (10) Patent No.: US 8,538,424 B2
(45) Date of Patent: Sep. 17, 2013

(54) SYSTEMS AND METHODS FOR MULTI-CHANNEL SEQUENTIAL DETECTION IN COGNITIVE RADIO SYSTEMS

(75) Inventor: Yan Xin, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 662 days.

(21) Appl. No.: 12/842,500

(22) Filed: Jul. 23, 2010

(65) Prior Publication Data

US 2011/0165850 A1 Jul. 7, 2011

Related U.S. Application Data

(60) Provisional application No. 61/292,553, filed on Jan. 6, 2010.

(51) Int. Cl.
*H04W 4/00* (2009.01)

(52) U.S. Cl.
USPC ............ 455/434; 455/450; 455/464; 370/227

(58) Field of Classification Search
USPC ................. 455/434, 450, 464, 8, 509, 166.2, 455/179.1; 370/227, 228, 251, 437, 443
See application file for complete search history.

(56) References Cited

U.S. PATENT DOCUMENTS

| 5,857,143 | A * | 1/1999 | Kataoka ........................... 455/62 |
| 8,155,649 | B2 * | 4/2012 | McHenry et al. ............. 455/434 |
| 8,326,313 | B2 * | 12/2012 | McHenry et al. ............. 455/454 |
| 2002/0077151 | A1 * | 6/2002 | Matthews et al. ............. 455/561 |
| 2002/0176386 | A1 * | 11/2002 | Singh ............................. 370/338 |
| 2007/0110001 | A1 * | 5/2007 | Ting et al. ..................... 370/332 |
| 2009/0233617 | A1 * | 9/2009 | Bjarnason et al. ......... 455/452.2 |
| 2012/0238267 | A1 * | 9/2012 | Kim et al. ..................... 455/434 |
| 2012/0263069 | A1 * | 10/2012 | Shao et al. .................... 370/252 |

OTHER PUBLICATIONS

Kim, S., et al. "Rate-Optimal and Reduced-Complexity Sequential Sensing Algorithms for Cognitive OFDM Radios" EURASIP Journal on Advances in Signal Processing, Special Issue on Dynamic Spectrum Access for Wireless Networking, Article ID 421540, Sep. 2009. pp. 141-146.

Lai, L., et al. "Quickest Sequential Opportunity Search in Multichannel Systems" Fifth International Workshop in Applied Probability. Jul. 2010. pp. 1-3.

Lim, T., et al. "GLRT-Based Spectrum Sensing for Cognitive Radio" Proceedings of the Global Communications Conference, 2008. GLOBECOM 2008. Nov.-Dec. 2008. pp. 1-5.

Quan, Z., et al. "Wideband Spectrum Sensing in Cognitive Radio Networks" Proceedings of the IEEE International Conference on Acoustics, Speech, and Signal Processing, ICASSP 2008. Mar.-Apr. 2008. pp. 901-906.

Zeng, Y., et al. "Maximum-Minimum Eigenvalue Detection for Cognitive Radio" 18th IEEE Annual International Symposium on Personal Indoor and Mobile Radio Communications (PIMRC 2007). Sep. 2007. (5 Pages).

* cited by examiner

*Primary Examiner* — Minh D Dao (74) *Attorney, Agent, or Firm* — Joseph Kolodka (57) ABSTRACT

Systems and methods for detecting unoccupied channels for a multi-channel cognitive radio system are described. To detect unoccupied channels, truncated sequential detection processes are employed that can use a dynamically extended truncation time that is based on early completion of detection processes applied to preceding channels.

20 Claims, 5 Drawing Sheets

SYSTEMS AND METHODS FOR MULTI-CHANNEL SEQUENTIAL DETECTION IN COGNITIVE RADIO SYSTEMS

RELATED APPLICATION INFORMATION

This application claims priority to provisional application Ser. No. 61/292,553 filed on Jan. 6, 2010, incorporated herein by reference.

BACKGROUND

1. Technical Field

The present invention relates to cognitive radio systems, and, in particular, to methods and systems for detecting unused channels in a cognitive radio system.

2. Description of the Related Art

Cognitive radio (CR) is a promising technology that can significantly improve spectrum utilization. One important aspect of CR systems is spectrum sensing, which is a research subject that has recently gained considerable interest. Most existing work on spectrum sensing has focused on a narrow-band single-channel scenario. Very recently, wide-band spectrum sensing has been studied especially for orthogonal frequency division multiplexing (OFDM) CR systems. In these works, multiple sensors (detectors), each for a channel, are needed to simultaneously observe multi-channels in an OFDM system. In addition, multi-channel joint energy detection and sequential detection schemes have been developed in an attempt to maximize overall throughput performance. Under this setting, a large number of sensors (detectors) are required when the number of subchannels in an OFDM system is large, and simultaneous operation of these sensors is also needed. However, it is often practically difficult for a CR system to equip a large number of detection sensors and operate them simultaneously.

SUMMARY

Exemplary embodiments of the present invention enable a user in a cognitive radio system to detect whether channels in the system are occupied or unused by employing sequential detection processes that utilize a sequentially added truncation scheme. For a relatively small timing constraint for completing the detection process, the embodiments discussed herein below use a relatively low number of samples per channel to detect whether the channel is occupied and also have a low probability of error with respect to channel occupancy decisions.

One exemplary embodiment of the present invention is directed to a method for detecting unused channels for a multi-channel cognitive radio system. A selected channel within a set of channels in the cognitive radio system can be processed by applying a sequential detection process to determine whether the selected channel is occupied by another user. In addition, a time difference between the time at which the sequential detection process for the selected channel is completed and a truncation time allocated for completing the sequential detection process for the selected channel is determined. Further, the processing and determining steps can be repeated on other selected channels until all channels within the set of channels have been processed to detect which of the channels of the set are unused. Here, the sequential detection process for an other selected channel employs a truncation time for completing the sequential detection process for the other selected channel that is the sum of the time difference determined for a most recently processed channel and a truncation time initially allocated for completing the sequential detection process for the other selected channel.

Another exemplary embodiment of the present invention is drawn towards a secondary user receiver apparatus for detecting unused channels in a multi-channel cognitive radio system. The apparatus may include a receiver configured to tune to selected channels within a set of channels in the cognitive radio system. In addition, the apparatus may further include a truncated sequential detection module configured to process a selected channel within the set of channels by applying a sequential detection process to determine whether the selected channel is occupied by another user. The detection module may be further configured to determine a time difference between the time at which the sequential detection process for the selected channel is completed and a truncation time allocated for completing the sequential detection process for the selected channel. The truncated sequential detection module may repeat the processing on and determining a time difference for other selected channels until all channels within the set of channels have been processed to detect which of the channels of the set are unused. Here, a truncation time for completing the sequential detection process for an other selected channel is the sum of the time difference determined for a most recently processed channel and a truncation time initially allocated for completing the sequential detection process for the other selected channel.

An alternative exemplary embodiment of the present invention is directed to a system for detecting unused channels for a multi-channel cognitive radio system. The system may include a receiver configured to extract samples from selected channels within a set of channels in the cognitive radio system. The system may further include a truncated sequential detection processing module configured to process samples from a selected channel within the set of channels by applying a sequential detection process to determine whether the selected channel is occupied by another user. In addition, the system may include a truncation time determination module configured to determine a time difference between the time at which the sequential detection process for the selected channel is completed and a truncation time allocated for completing the sequential detection process for the selected channel. Here, the truncated sequential detection processing module and the truncation time determination module can be configured to repeat the processing and determining, respectively, on other selected channels until all channels within the set of channels have been processed to detect which of the channels of the set are unused. Furthermore, the truncated sequential detection processing module may employ a truncation time for completing the sequential detection process for an other selected channel that is provided by the truncation time determination module and is the sum of the time difference determined for a most recently processed channel and the truncation time initially allocated for completing the sequential detection process for the other selected channel.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In exemplary embodiments described herein below, spectrum scanning for a multi-channel CR system by employing a single detector is considered. For example, the detector can be used to observe one channel at a time. According to exemplary aspects, spectrum scanning schemes can be applied to minimize a cost function and thereby strike a balance between error probabilities and detection delay. A multi-channel sequential detection scheme is described herein below with respect to an infinite horizon scenario, in which there is no strict delay constraint on spectrum scanning. That is, spectrum scanning continues until completion of the detection process.

The scheme can be truncated for a finite horizon scenario, in which there is a delay constraint on spectrum scanning (i.e. spectrum scanning is completed within a certain time period). As discussed further herein below, an optimal scanning process can be employed by using a novel truncation method with sequential detection processes or algorithms, such as sequential probability ratio test algorithms (SPRT), concatenated sequential probability ratio test (C-SPRT) and sequential shifted chi-square test (SSCT).

In exemplary embodiments described herein, a single secondary user (SU) wide-band communication system is considered. The SU may have a single detector and is permitted to opportunistically access a primary wide-band frequency spectrum of K non-overlapping channels. That is, the SU is permitted to use the channels that are not occupied by primary users (PUs). Most likely, at a given instant of time, some of the frequency channels are occupied by PUs while some are not occupied and, thus, can be used by the SU.

Let $Y_j^{(k)}$ denote the signal received by the SU, at time j from channel k. If there is no primary transmission over channel k at time j, then the received signal $Y_j^{(k)}$ can be written as $Y_j^{(k)} = W_j^{(k)}$, in which $W_j^{(k)}$ is modeled as a white Gaussian noise with mean zero and variance $[\sigma^{(k)}]^2$, i.e., $W_j^{(k)} : N(0, [\sigma^{(k)}]^2)$; whereas, if there is a primary transmission over channel k at time j, then the received signal $Y_j^{(k)}$ can be written as) $Y_j^{(k)} = h^{(k)} S_j^{(k)} + W_j^{(k)}$, in which $h^{(k)}$ is the k th channel coefficient between the PU using the channel and the SU, and $S_j^{(k)}$ denotes the primary signal transmitted over channel k at time j. It is further assumed that: A1) the channel gain $h^{(k)}$ is perfectly known at the SU and $|h^{(k)}|^2 = 1$; A2) the channel gain $h^{(k)}$ is independent of the noise samples $W_j^{(k)}$ for any k; and A3) the primary signals are assumed to be Gaussian distributed with mean zero and variance $P^{(k)}$, which depends on the channel index k, i.e., $S_j^{(k)} \sim CN(0, P^{(k)})$. Mathematically, the detection of the primary signals at the k th channel can be formulated as a binary hypothesis testing problem as follows:

$$H_0^k : Y_j^{(k)} = W_j^{(k)}, j=1,2,\ldots$$

$$H_1^k : Y_j^{(k)} = X_j^{(k)} + W_j^{(k)}, j=1,2,\ldots \quad (1)$$

where $X_j^{(k)} := h^{(k)} S_j^{(k)}$. Clearly, under $H_0^{(k)}$, $Y_j^{(k)} : CN(0, [\sigma^{(k)}]^2)$, while under $H_1^{(k)}$, $Y_j^{(k)} \sim CN(0, [\sigma^{(k)}]^2$. Let $\pi_0^{(k)}$ denote the a priori probability that channel k is occupied by the PU. Generally speaking, the values of $\pi_0^{(k)}$ are different for different channels. It is further assumed that whether a channel is occupied or not is independent of occupancies of all the other channels. One goal here is to design a process to quickly decide the presence/absence of the PU on each channel in a way that minimizes an appropriate measure that takes into account detection error probabilities and the cost of sampling.

A sequential testing setup is considered. Denote by K the set of the K channels, i.e., K=(1, ..., K). At each time j, the SU tunes to a channel from K and make an observation. After making an observation, the SU decides to stop, continues scanning on the same channel or switches to another channel to make an observation. Let τ denote the stopping time when the SU decides to stop scanning. If the SU stops scanning at time j, then it determines the occupancy of each channel by using the following decision rule $\delta_j = \delta_j^{(1)}, \ldots, \delta_j^{(K)}$, in which $\delta_j^{(k)}$ takes values in {0,1} with 0 indicating that channel k is free and 1 indicating that channel k is occupied.

Let $\delta = \{\delta_j, j=1, 2, \ldots\}$ denote the sequence of decision rules used at the SU. If the SU chooses to continue scanning, then it uses the channel selection function $\phi_j$ to select a channel from the set K and makes another observation from the selected channel. $\phi = \{\phi_j, j=1, 2, \ldots\}$ is used to denote the sequence of channel selection functions. At the end of scanning, there are two types of error probabilities for channel k: 1) the false-alarm probability $P_{FA}^{(k)}$, which is the probability of declaring hypothesis $H_1^{(k)}$ is true (meaning that channel k is declared to be occupied) while hypothesis $H_0^{(k)}$ is true (meaning that channel k is indeed free); and 2) the miss-detection probability $P_{MD}^{(k)}$, which is the probability of declaring hypothesis $H_0^{(k)}$ to be true (meaning that channel k is declared to be free) while hypothesis $H_1^{(k)}$ is true (meaning that channel k is indeed occupied).

Intuitively speaking, the lower $P_{FA}^{(k)}$ is, the higher the probability that the SU uses licensed bands; whereas, the lower $P_{MD}^{(k)}$ is, the lower the probability that the SU interferes with primary transmissions. Both types of error probabilities can be made arbitrarily small by letting the number of samples used go to infinity. However, this will incur significant delay to reach a decision. Therefore, an appropriate cost function should strike a desirable tradeoff between the decision delay and the detection error probabilities.

In accordance with exemplary aspects, the stopping time τ, the decision rules δ and the channel selection rules φ are determined to minimize the cost $$\inf_{\tau, \delta, \phi} \left[ cE\{\tau\} + \sum_{k=1}^{K} \left( c_0^{(k)} (1 - \pi_0^{(k)}) P_{FA}^{(k)} + c_1^{(k)} \pi_0^{(k)} P_{MD}^{(k)} \right) \right], \quad (2)$$

where E is expectation under the probability measure $q_\pi = [q^{(1)}, q^{(2)}, \ldots, q^{(K)}]$ with $q^{(k)} := (1 - \pi_0^{(k)}) q_0 + \pi_0^{(k)} q_1$. The parameter c denotes the cost of taking one sample, which is assumed to be constant for all the channels, and hence the term $cE\{\tau\}$ in the cost function represents the average cost of sampling. Similarly, $c_0^{(k)}$ denotes the cost of a false alarm event happening over channel k, and $c_1^{(k)}$ denotes the cost of a miss detection event happening over channel k. For generality, $c_0^{(k)}$ and $c_1^{(k)}$ are permitted to be different for different channels. Clearly, the term $(1 - \pi_0^{(k)}) c_0^{(k)} P_{FA}^{(k)} + \pi_0^{(k)} P_{MD}^{(k)}$ is the average cost of detection errors over channel k. Hence, the cost function specified in (2) takes into consideration detection error probabilities and sampling cost, which are two key parameters closely related to the throughput of the SU systems.

Turning now to scanning processes that can solve optimization problem (2), some notations employed herein below are described. Let $\pi_j^{(k)}$ denote the posterior probability that channel k is occupied after collecting observations up to time j. $\pi_j$ is defined as $\pi_j := \pi_j^{(1)}, \ldots, \pi_j^{(K)}$. If $\phi_j = k$, that is the SU selects channel k to sense at time j, then via Bayesian rule, the posterior probability of channel k being occupied can be updated after collecting an observation $Y_j^{(k)}$ using the following equation:

$$\pi_j^{(k)} = \frac{\pi_{j-1}^{(k)} q_1(Y_j^{(k)})}{\pi_{j-1}^{(k)} q_1(Y_j^{(k)}) + (1 - \pi_{j-1}^{(k)}) q_0(Y_j^{(k)})}, \quad (3)$$

in which $q_1(\cdot)$ is the density function of $CN(0, P^{(k)} + [\sigma^{(k)}]^2)$ and $q_0(\cdot)$ is the density function of $CN(0, [\sigma^{(k)}]^2)$. More specifically, $$q_0(Y_j^{(k)}) = \frac{1}{\pi [\sigma^{(k)}]^2} \exp\left(-\frac{|Y_j^{(k)}|^2}{[\sigma^{(k)}]^2}\right)$$

$$q_1(Y_j^{(k)}) = \frac{1}{\pi (P^{(k)} + [\sigma^{(k)}]^2)} \exp\left(-\frac{|Y_j^{(k)}|^2}{P^{(k)} + [\sigma^{(k)}]^2}\right).$$

For channel k that is not selected at time j, the posterior probability $\pi_j^{(k)}$ is not updated, i.e., $\pi_j^{(k)} = \pi_{j-1}^{(k)}$.

At this point, it is not clear whether $\pi_j$ is a sufficient statistic for the optimization problem (2). If $\pi_j$ is a sufficient statistic, then at time j, a stopping decision, hypothesis decision and channel selection decision can be made solely based on $\pi_j$. This will greatly simplify the problem. As shown herein below, $\pi_j$ is indeed a sufficient statistic for the problem.

Firstly, the optimal terminal decision rules $\delta$ are considered. For any given stopping time $\tau$ and channel selection rules $\phi$, it can be shown that the following simple terminal decision rule is optimal:

$$\delta_\tau^{(k)} = \begin{cases} 1, & \text{if } c_1^{(k)} \pi_\tau^{(k)} \geq c_0^{(k)} (1 - \pi_\tau^{(k)}), \\ 0, & \text{if } c_1^{(k)} \pi_\tau^{(k)} < c_0^{(k)} (1 - \pi_\tau^{(k)}), \end{cases} \quad (4)$$

for any $k \in \{1, \ldots, K\}$. Here, $c_1^{(k)} \pi_\tau^{(k)}$ is the average cost of making a miss detection error; that is, channel k is declared to be free while channel k is busy. Similarly, $c_0^{(k)}(1 - \pi_\tau^{(k)})$ is the average cost of making a false alarm error, where channel k is determined to be busy when channel k is in fact unoccupied. Thus, in accordance with equation (4), channel k is declared to be occupied if the cost of a miss detection event is larger than that of a false alarm event. In turn, channel k is declared to be free if the cost of a false alarm event is larger than that of a miss detection event.

This result suggests that the terminal decisions can be made only based on $\pi_j$. With these terminal decision rules, the objective function in (2) is then converted into $$\inf_{\tau, \phi} E\left[c\tau + \sum_{k=1}^{K} \min\{c_0^{(k)}(1 - \pi_\tau^{(k)}), c_1^{(k)} \pi_\tau^{(k)}\}\right]. \quad (5)$$

Results from optimal stopping time can be used to solve this problem.

An optimal solution for this problem can be obtained for the infinite horizon scenario by exploiting the decoupled structure of the optimization problem (5). For any stopping time $\tau$, let $\tau^{(k)}$ be the amount of time spent on detecting channel k, then (5) can be rewritten as $$cE\left\{\sum_{k=1}^{K} \tau^{(k)}\right\} + \sum_{k=1}^{K} \min\{c_0^{(k)}(1 - \pi_\tau^{(k)}), c_1^{(k)} \pi_\tau^{(k)}\} = \quad (6)$$

$$c\sum_{k=1}^{K} E\{\tau^{(k)}\} + \sum_{k=1}^{K} \min\{c_0^{(k)}(1 - \pi_\tau^{(k)}), c_1^{(k)} \pi_\tau^{(k)}\} =$$

$$\sum_{k=1}^{K} \{cE\{\tau^{(k)}\} + \min\{c_0^{(k)}(1 - \pi_\tau^{(k)}), c_1^{(k)} \pi_\tau^{(k)}\}\}.$$

As a result, the quantity which is to be minimized is only related to the total amount of detection time. Particularly, the quantity is not dependent on the sensing ordering parameter $\phi$ (channel selection rules). Once $E\{\tau^{(k)}\} + \min\{c_0^{(k)}(1 - \pi_\tau^{(k)}), c_1^{(k)} \pi_\tau^{(k)}\}$ is minimized for each channel k, the summation is also minimized. One key observation is that these K optimization problems are independent of each other. Thus, each term can be minimized independently.

For each k, a solution that minimizes $E\{\tau^{(k)}\} + \min\{c_0^{(k)}(1 - \pi_\tau^{(k)}), c_1^{(k)} \pi_\tau^{(k)}\}$ is the well-known sequential probability ratio test (SPRT) algorithm. More specifically, for any c, $c_0^{(k)}$ and $c_1^{(k)}$, the solution is parameterized by two parameters $U^{(k)}$ and $L^{(k)}$. After taking each sample from channel k, the posterior probability $\pi_j^{(k)}$ can be updated. If $\pi_j^{(k)}$ lies in $(L^{(k)}, U^{(k)})$, channel k is further processed and more samples are taken. If $\pi_j^{(k)} \geq U^{(k)}$, sampling on channel k is stopped and channel k is declared free (unused). If $\pi_j^{(k)} \leq L^{(k)}$, sampling on channel k is also stopped, and channel k is declared busy (occupied).

Because the optimization problem does not depend on $\phi$, without loss of optimality, scanning can begin on channel 1. Once scanning on band 1, is finished, scanning on channel 2 is begun, etc. The whole scanning process is terminated once scanning on channel K is finished. In summary, the following solution may be applied:

1. Initialization: Given noise variance $[\sigma^{(k)}]^2$ and signal power $P^{(k)}$, the cost of errors $c_0^{(k)}$ and $c_1^{(k)}$, compute parameters $L^{(k)}$ and $U^{(k)}$.

2. Starting from band 1, after taking each sample from channel k, use equation (3) to update the posterior probability. If $\pi^{(k)} \in (L^{(k)}, U^{(k)})$, take more samples on channel k. If $\pi_j^{(k)} \geq U^{(k)}$, declare that channel k is free, and switch to channel k+1 to sense. If $g\pi_j^{(k)} \leq L^{(k)}$, declare that channel k is busy and switch to channel k+1 and repeat the detection process for channel k+1.

3. The scanning is finished after scanning channel K is finished.

For the signal model considered, the test can be further simplified. Let $S^{(k)}$ denote the set of time slots on which channel k is selected to sense up to time j, then $$\pi_j^{(k)} = \frac{\pi_0^{(k)} \prod_{i \in S^{(k)}} q_1(Y_i^{(k)})}{\pi_0^{(k)} \prod_{i \in S^{(k)}} q_1(Y_i^{(k)}) + (1-\pi_0^{(k)}) \prod_{i \in S^{(k)}} q_0(Y_i^{(k)})}, \quad (7)$$

hence $\pi_j^{(k)} > U^{(k)}$ and $\pi_j^{(k)} < L^{(k)}$ imply that $$\frac{\prod_{i \in S^{(k)}} q_1(Y_i^{(k)})}{\prod_{i \in S^{(k)}} q_0(Y_i^{(k)})} > \frac{U^{(k)}(1-\pi_0^{(k)})}{\pi_0^{(k)}(1-U^{(k)})} := B_U^{(k)},$$

$$\frac{\prod_{i \in S^{(k)}} q_1(Y_i^{(k)})}{\prod_{i \in S^{(k)}} q_0(Y_i^{(k)})} < \frac{L^{(k)}(1-\pi_0^{(k)})}{\pi_0^{(k)}(1-L^{(k)})} := B_L^{(k)},$$

respectively. Because $Q_0 \sim CN(0,[\sigma^{(k)}]^2)$ and $Q_1 \sim CN(0,P^{(k)}+[\sigma^{(k)}]^2)$, these two equations can be further simplified as $$\sum_{i \in S^{(k)}} [Y_i^{(k)}]^2 > d^{(k)} \left( |S^{(k)}| \log \left(1 + \frac{P^{(k)}}{[\sigma^{(k)}]^2}\right) + \log B_U^{(k)} \right), \quad (8)$$

$$\sum_{i \in S^{(k)}} [Y_i^{(k)}]^2 < d^{(k)} \left( |S^{(k)}| \log \left(1 + \frac{P^{(k)}}{[\sigma^{(k)}]^2}\right) + \log B_L^{(k)} \right), \quad (9)$$

in which $$d^{(k)} = \frac{[\sigma^{(k)}]^2 (P^{(k)} + [\sigma^{(k)}]^2)}{P^{(k)}}. \quad (10)$$

For general parameters, it is difficult to obtain close form expressions for the boundary values $B_U^{(k)}$ and $B_L^{(k)}$. Because an optimal solution is the concatenated SPRT, the approximation techniques for the SPRT can be used to simplify the computation of $B_L^{(k)}$ and $B_U^{(k)}$. In practice, the target error probabilities should be specified; that is $P_{FA}^{(k)}$ and $P_{MD}^{(k)}$ are pre-determined. Then, using Wald's approximation, the following can be obtained $$B_U^{(k)} = \frac{1 - P_{MD}^{(k)}}{P_{FA}^{(k)}}, \quad B_L^{(k)} = \frac{P_{MD}^{(k)}}{1 - P_{FA}^{(k)}}. \quad (11)$$

It can be shown that if parameters are set in this way, the error probabilities will be bounded by the preset $P_{MD}^{(k)}$ and $P_{FA}^{(k)}$.

The average sample number (ASN) of the C-SPRT is now evaluated. Here, the k th channel is considered. Let $\tau_l^{(k)}$ be the sample number needed to reach a decision for the k th channel under $H_l$ for l=0,1. The following parameters are defined: $Z_i^{(k)} := \log [q_1(Y_i^{(k)})/q_0(Y_i^{(k)})]$ and $r^{(k)} = [\sigma^{(k)}]^2/(P^{(k)} + [\sigma^{(k)}]^2)$. $Z_i^{(k)}$ can be readily computed as $$Z_i^{(k)} = \log r^{(k)} + |Y_i^{(k)}|^2 \left( \frac{1}{[\sigma^{(k)}]^2} - \frac{1}{P^{(k)} + [\sigma^{(k)}]^2} \right).$$

By some straightforward computation, the following can be obtained $$\mu_0^{(k)} := E[Z_i^{(k)}|H_0] = \log r^{(k)} + 1 - r^{(k)} \quad (12)$$

$$\mu_1^{(k)} := E[Z_i^{(k)}|H_1] = \log r^{(k)} + [r^{(k)}]^{-1} - 1. \quad (13)$$

It can be shown that $$E[\tau_l^{(k)} | H_l] \approx \frac{1}{\mu_l^{(k)}} \frac{B_L^{(k)}[\exp(t_l B_U^{(k)}) - 1] + B_U^{(k)}[1 - \exp(t_l B_L^{(k)})]}{\exp(t_l B_U^{(k)}) - \exp(t_l B_L^{(k)})},$$

$l = 0, 1$ where $t_l$ is a nonzero constant satisfying $E[\exp(t_l Z_i^{(k)})|H_l]=1$. It can be readily determined that $t_0$ is equal to 1 while $t_1$ is equal to −1.

Clearly, the overall average sample number can be expressed as $$E(\tau) = \sum_{k=1}^{K} E[\tau_l^{(k)} | H_0](1 - \pi_0^{(k)}) + E[\tau_l^{(k)} | H_1] \pi_0^{(k)}. \quad (14)$$

In summary, the following simplified scanning scheme can be employed:

1. Given target error probabilities $P_{MD}^{(k)}$ and $P_{FA}^{(k)}$, use equation (11) to compute $B_L^{(k)}$ and $B_U^{(k)}$.
2. After taking a sample $Y_i^{(k)}$ from channel k, use equations (8) and (9) to decide whether to proceed to the next band or not. If equation (8) is satisfied, declare that channel k is busy and proceed to the next channel for processing. If equation (9) is satisfied, then declare that channel k is free and proceed to the next channel for processing. If neither of equations (8) or (9) are satisfied, stay on channel k to observe and process more samples.

As discussed above, an optimal solution in the infinite-horizon case is concatenated SPRT. However, because there is generally a fixed sensing deadline in practice, a truncated C-SPRT may be used to detect free channels in the CR system in a real-world environment. As mentioned above, a truncated C-SPRT may be employed to strike a desirable tradeoff between complexity and detection performance. In the following, a sequentially added truncation method is described and compared with other truncation methods, including uniform truncation, tail truncation and uniformly added truncation. Without loss of generality, it is assumed here that the overall detection process is constrained to be completed within a period of time T.

Figure 1:
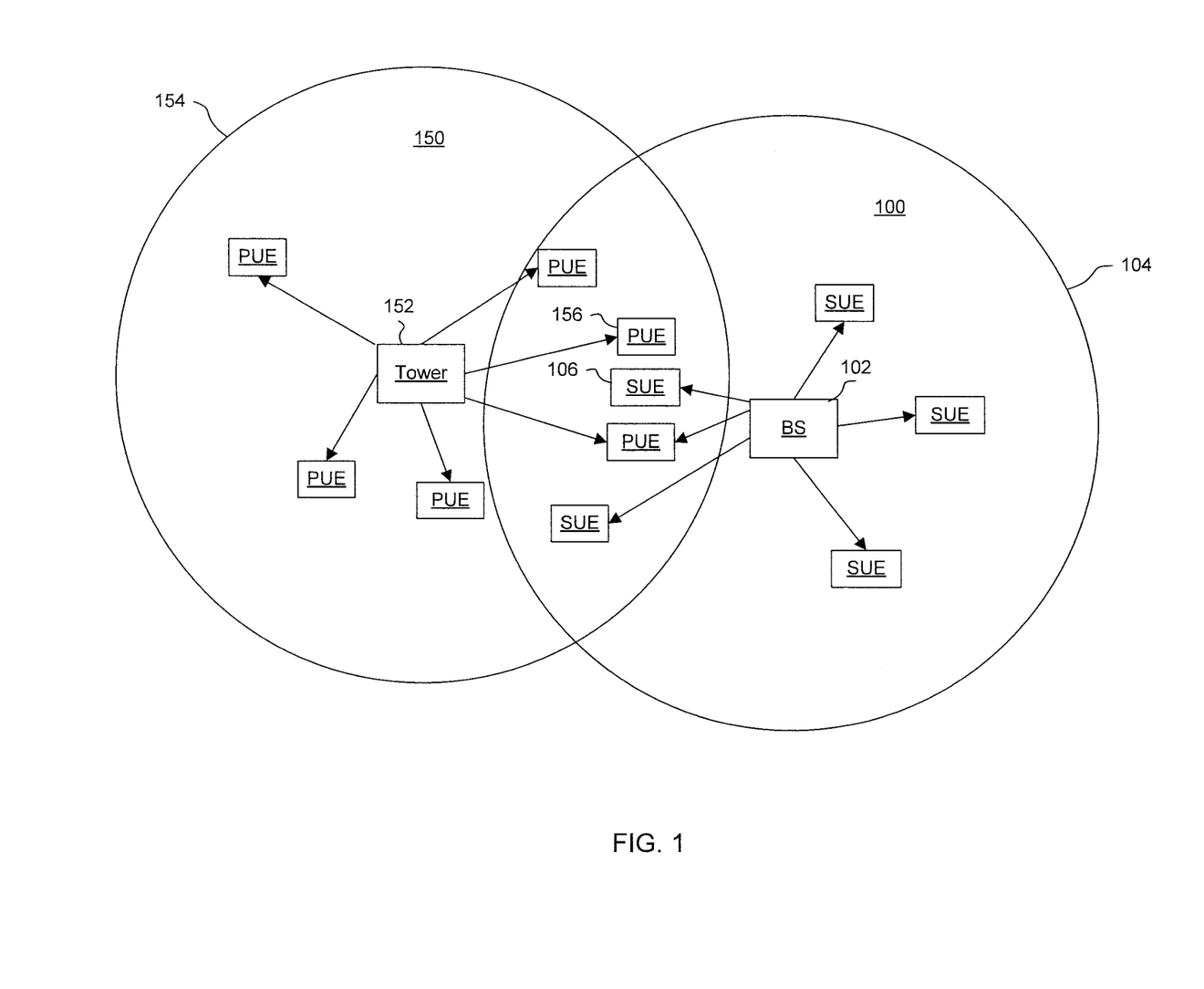
FIG. 1 is a block diagram of an exemplary cognitive radio system.

Referring now in detail to the figures in which like numerals represent the same or similar elements and initially to FIG. 1, a cognitive radio system 100 in which exemplary embodiments of the present invention can be implemented is briefly described. System 100 may include a wireless base station 102, for example, a cellular network base station or a world interoperability for microwave access (WiMAX) base station, having a service range 104. Although only one base station is shown, a cognitive radio system may include a plurality of base stations servicing a plurality of different users. The cognitive radio system 100 may further comprise a set of secondary user equipment 106 serviced by the base station 102 within its range 104. In addition, the range 104 of the cognitive radio system 100 may overlap with the range 154 of a transmission tower 152 of a primary user network system 150 that services primary user equipment 156. Primary users may, for example, be subscribers of television services. Here, primary users 156 are granted a preferred access privilege over secondary users 106 with regard to at least a subset of the available channels. In this example, the system 100 employs multiple channels (or multiple sub-bands), such as OFDMA channels (or sub-bands); however, other modulation schemes may be utilized.

In accordance with exemplary embodiments of the present invention, secondary users 106 are provided with a means for discovering unused channels. The channels are "unused" or "unoccupied" in the sense that the channels are not employed for communications between the base station 102 or tower 152 and other users over some interval of time within the area serviced by base station 102. As mentioned above, sequential detection processes can be utilized by secondary users to discover channels and employ the unused channels for their own communications with the base station 102. In particular, according to exemplary aspects of the present invention, a sequentially added truncation method can be applied to discover unoccupied channels, as discussed herein below.

As noted above, T is assumed to be the maximum scanning period. In other words, the secondary user system is constrained to finish the multi-channel scanning within time T. Sequentially added truncation can be used to truncate sequential detection processes or algorithms such as C-SPRT or concatenated sequential shifted chi-square test (C-SSCT). Compared with other potential truncation methods, the sequentially added truncation method performs well when T is large or small. To be specific, when T is sufficiently large, the sequentially added truncation method performs similarly to tail truncation, and when T is relatively small, the proposed sequentially added truncation method performs best among several potential truncation options.

Figure 2:
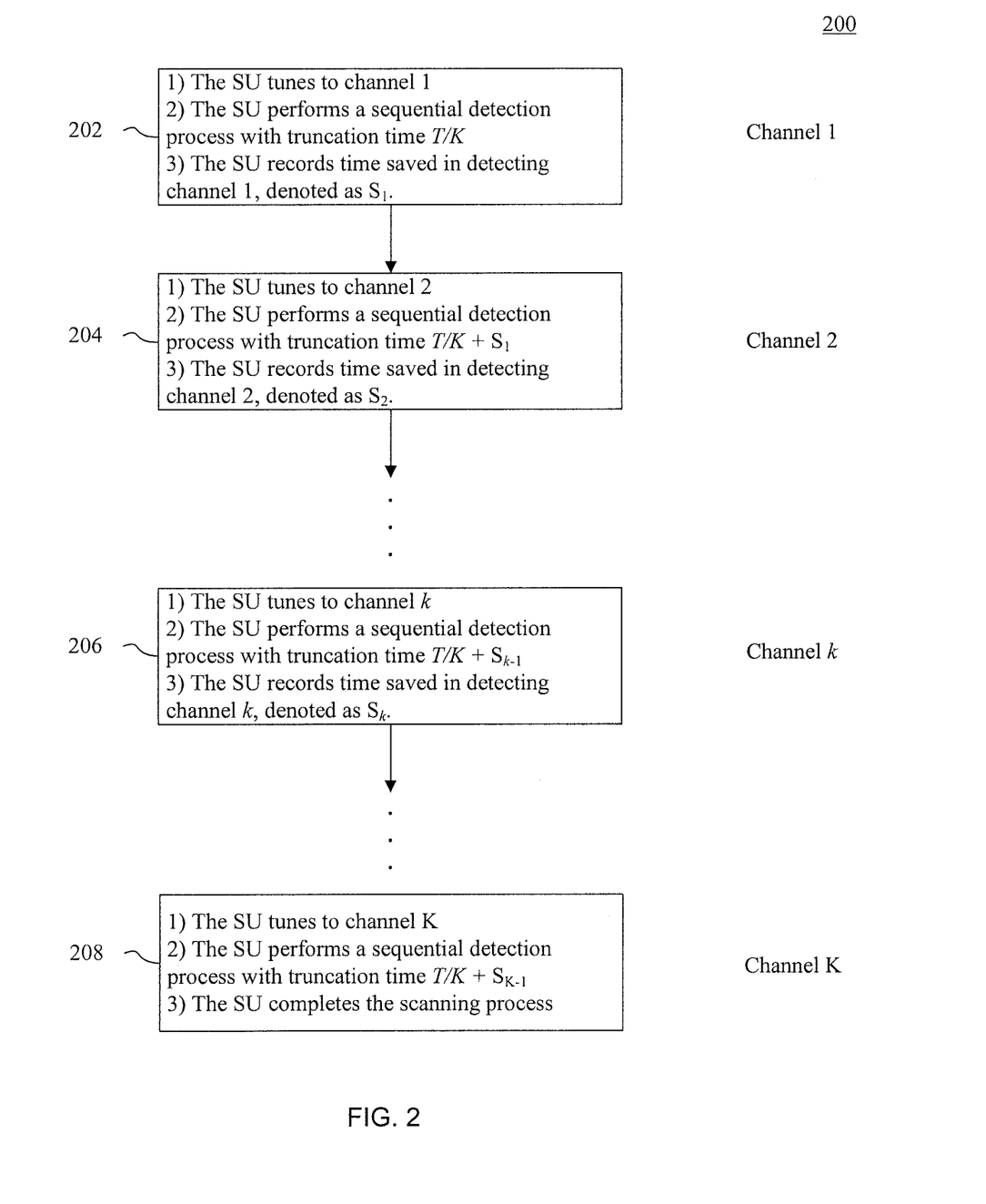
FIG. 2 is a block/flow diagram of a method for detecting whether channels for a cognitive radio system are occupied in accordance with an exemplary embodiment.

With reference now to FIG. 2, a block/flow diagram of a method 200 illustrating a channel by channel processing scheme in accordance with one exemplary sequentially added truncation approach. The method 200 may begin at block 202 in which the secondary user chooses and tunes to one channel from K channels randomly, simply referred to here as channel 1. The SU performs a sequential detection process such as SPRT or SSCT that is truncated with truncation time T/K. Let $\tau^{(1)}$ be the time spent on detecting whether channel 1 (referred hereon as 'detection time') is occupied. Here, $\tau^{(1)} \leq T/K$. The SU keeps a record of the saved detection time, which is equal to $S_1 := [T/K - \tau^{(1)}]^+$, where $[x]^+ := \max(x,0)$.

At block 204, the SU performs a procedure, similar to the procedure performed at block 202, on channel 2, which may also be chosen randomly, except that the truncation time now is $T/K+S_1$, where $S_1$ is added to the initially allocated truncation time T/K for channel 2. For example, the secondary user chooses and tunes to one channel, channel 2 (different from channel 1), from K channels randomly. The SU performs the truncated sequential detection process with truncation time $T/K+S_1$. Similar to block 202, $\tau^{(2)}$ is the detection time for channel 2. The SU keeps a record of the saved detection time, which is equal to $S_2:=[S_1+T/K-\tau^{(2)}]^+$ and which is added to the initially allocated truncation time T/K for the channel processed in the next block.

The method continues the process for other channels and at block 206, the SU performs a procedure similar to the procedure described in block 202 on randomly chosen channel k (different from channels chosen in earlier blocks) except that the truncation time now is $T/K+S_{k-1}$, where $S_{k-1}$ is defined recursively as follows:

$$S_0 = 0, S_{k-1} = \left[S_{k-2} + \frac{T}{K} - \tau^{(k-1)}\right]^+, k \geq k > 1, \text{ with } \tau^{(k)}$$

denoting the detection time for channel k. For example, the secondary user selects and tunes to one channel, channel k, from K channels randomly, different from channels processed earlier. The SU performs the truncated sequential detection process with truncation time $T/K+S_{k-1}$, which is the sum of the initially allocated truncation time, T/K, and $S_{k-1}$. Similarly, $\tau^{(k)}$ is recorded, $S_k$ is determined and $S_k$ is added to the truncation time, T/K, initially allocated for the channel processed in the next block, k+1. Here, $S_k$ is the time difference between the time at which the sequential detection process for the channel k is completed, $\tau^{(k)}$, and a truncation time, $T/K+S_{k-1}$ allocated for completing the sequential detection process for the selected channel. In other words, $$S_0 = 0, S_k = \left[S_{k-1} + \frac{T}{K} - \tau^{(k)}\right]^+, k \geq 1.$$

It should be noted that, here, the time difference is set to zero if it is negative.

The method continues for other channels and ends at block 208, in which the SU selects and tunes to the last channel in the set that has not yet been processed, channel K, and performs the truncated sequential detection process with truncation time $T/K+S_{K-1}$. In summary, the SU allocates the time saved in detecting Channel k to Channel k+1 for k=1, . . . , K−1. It should be noted that, in accordance with exemplary aspects, $S_k$ for a random channel k may be a negative number:

$$S_0 = 0, S_k = S_{k-1} + \frac{T}{K} - \tau^{(k)}, K \geq k > 1.$$

In other words, if the detection time $\tau^{(k)}$ for the channel k exceeds $T/K+S_{k-1}$, then the time lost can be compensated for in later blocks, which may offset the lost time with any saved time that is completed prior to the expiration of T/K for subsequently processed channels. Here, a threshold M may be applied such that if $S_k$ is negative and about to exceed threshold M, then the detection process for channel k can automatically cease and a declaration as to whether channel k is occupied or not can be based on final test statistics, as discussed further herein below. In turn, if the detection process is applied to the last channel selected, channel K, and the time spent in the overall detection process is at and about to exceed T, then a declaration as to whether channel k is occupied or not can also be based on final, corresponding test statistics. Additionally, in accordance with other exemplary aspects, the method can be configured such that if the detection process for any channel k is at and about to exceed $T/K+S_{k-1}$, then the declaration as to whether channel k is occupied or not can be determined in accordance with final test statistics and $S_k$ can be set to zero.

Figure 3:
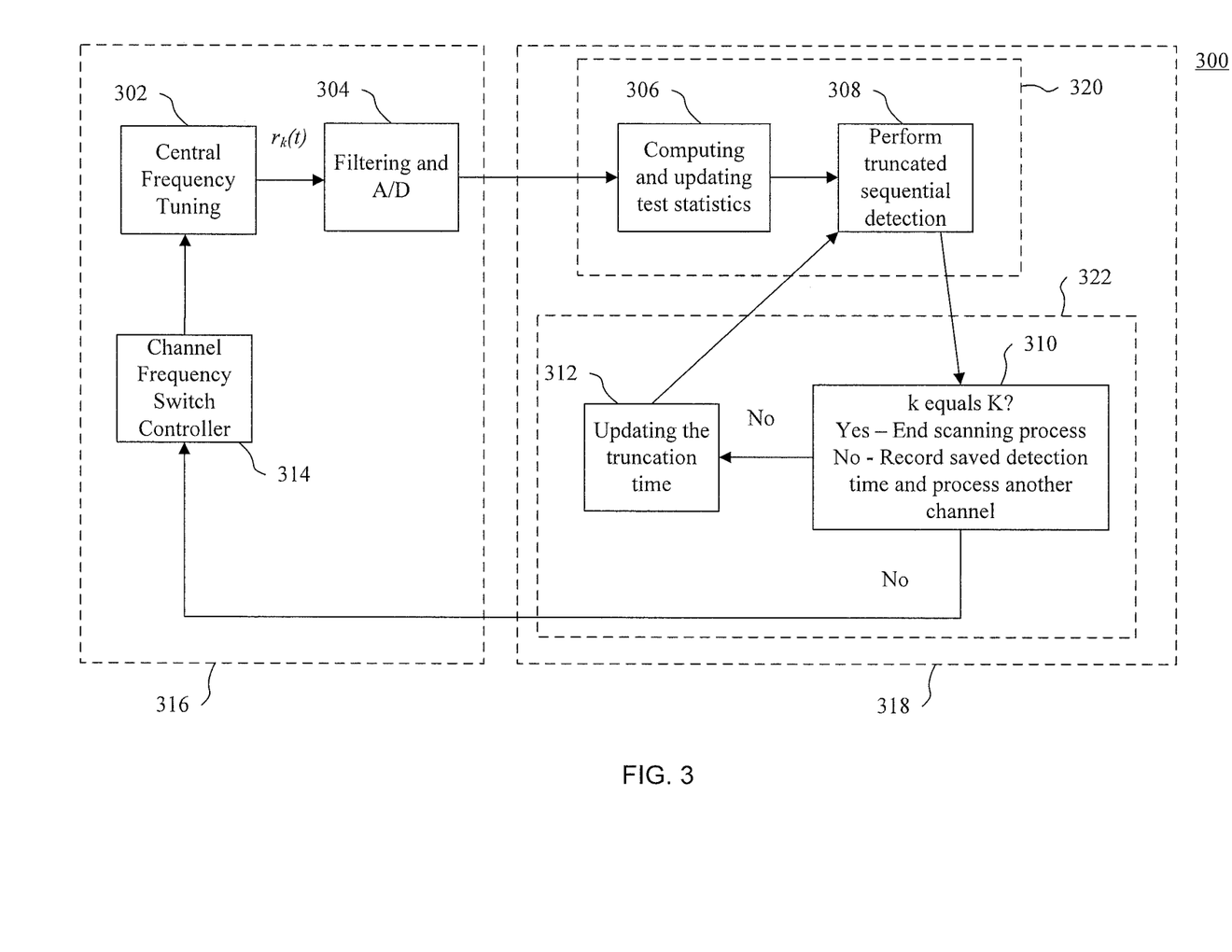
FIG. 3 is a block/flow diagram of a system/method for detecting whether channels for a cognitive radio system are occupied in accordance with an exemplary embodiment.

Referring now to FIG. 3 with continuing reference to FIG. 2, a block/flow diagram of an exemplary system/method 300 for detecting unused channels for a multi-channel cognitive radio system according to exemplary embodiments of the present invention is illustrated. It should be understood that any and all aspects discussed above can be implemented within and utilized by system/method 300. For example, system/method 300 can be configured to perform method 200 discussed above with regard to FIG. 2. In addition, system/method 300 may be embodied, for example, in the secondary user equipment 106 discussed above with regard to FIG. 1.

System/method 300 may include a receiver block 316 for processing received signals on channels of a cognitive radio system and a truncated sequential detection block or module 318 for determining whether the channels are occupied. For example, the receiver block 316 may include a central frequency tuner block 302 for tuning to selected channels for processing. The receiver block 316 may further include a filter and analogue to digital converter block 304 for filtering signals on channels to which the receiver is tuned via block 302 and for converting the received analogue signals to digital signals. In addition, the receiver block 316 may also include a channel frequency switch controller 314 that directs the tuner block 302 to switch tuning to a different channel in the CR system in accordance with commands issued by the truncated sequential detection block 318. The detection block 318 may include a truncated sequential detection processing block or module 320 and a truncation time determination block or module 322. Blocks 320 and 322 are discussed in more detail below with regard to a processing example. As indicated above, exemplary embodiments of the present invention can be implemented at a secondary user by employing a single detector.

Channels in the cognitive radio system can be processed and evaluated in system/method 300 to determine whether they are occupied or unoccupied as follows.

At block 302, the SU may tune to the central frequency of a selected channel in the cognitive radio system on which the detection process will be applied.

At block 304, the received signals can pass through a band-pass filter and can be converted into digital signals, as mentioned above.

At block 320, a selected channel within the set of K channels in the cognitive radio system can be processed by applying a sequential detection process to determine whether the selected channel is occupied. For example, at block 306, a test statistic, an upper boundary parameter and a lower boundary parameter in a sequential detection process can be determined based on samples of signals received on the selected channel and can be updated over time. For example, as discussed above, the test statistic may be a posterior probability, $\pi^{(k)}$, that the selected channel is occupied, and can be determined for comparison with upper boundary parameter $U^{(k)}$ and lower boundary parameter $L^{(k)}$, which may also be determined at block 306. Alternatively, as discussed above, the test statistic may be $$\sum_{i \in S^{(k)}} [Y_i^k]^2$$

in equations (8) and (9), while the upper boundary parameter may correspond to the term on the right side of the inequality in equation (8) and the lower boundary parameter may correspond to the term on the right side of the inequality in equation (9). As shown in equations (8) and (9), the upper and lower boundary parameters may be dependent on $B_U^{(k)}$ and $B_L^{(k)}$, respectively, which, in turn, can be computed in accordance with equation (11), as discussed above.

Furthermore, at block 308, the SU performs truncated sequential detection processes or algorithms to determine whether the selected channel is occupied or unused. For example, as noted above, the sequential detection processes may be SPRT, C-SPRT or C-SSCT. In addition, at block 308, the SU may determine whether the selected channel is occupied based on a comparison between the test statistic and at least one of the lower and upper boundary parameters. For example, if the test statistic exceeds the upper boundary parameter and the truncation time is not reached, the SU can determine that the channel is busy or occupied. If the test statistic exceeds the lower boundary parameter and the truncation time is not reached, the SU can determine that the channel is free or unoccupied. If the test statistic is between two boundary parameters and the truncation time is not reached, the detection block 318 may collect another sample via the receiver 316 on the selected channel, may update the test statistic based on the additionally collected sample and may repeat the comparison. If the truncation time is reached, then the SU makes a decision based on the final test statistics. For example, when the truncation time is reached, the SU can compare the final test statistics with a predetermined threshold. As an example, it can be assumed that the SU employs the C-SPRT. Here, the SU can determine that a PU is present on a particular channel or sub-band if the final test statistics are larger than or equal to the predetermined threshold and can determine that the PU is absent on the particular channel or sub-band if the final statistics are less than the predetermined threshold. The choice of this predetermined threshold can be based on many factors, such as the parameter K and target error probabilities.

At block 310, the SU can determine whether all of the channels in the set of K channels have been processed. For example, the SU can determine whether the current channel index, k, is equal to the maximum channel index, K. If the current index K is reached (i.e., all K channels in the set have been processed), the SU can end the scanning process. Otherwise, the SU at block 310 can record the time saved in processing the selected channel k, $\tau^{(k)}$, and can determine a time difference between the time at which the sequential detection process for the selected channel is completed and a truncation time allocated for completing the sequential detection process for the selected channel. For example, as discussed above with regard to method 200, for a selected channel k, the time difference can correspond to $$S_k = \left[ S_{k-1} + \frac{T}{K} - \tau^{(k)} \right]^+.$$

Thereafter, the truncation time determination block 322 can direct the receiver channel frequency switch controller 314 of receiver 316 to switch to another channel within the set of K channels for further processing. Thus, at block 314, the SU switches its central frequency to another channel, k+1.

At block 312, the truncation time for the next channel on which a detection process is applied is updated. For example, here, the next channel, k+1, is the same channel to which the determination block 322 directs the receiver channel frequency switch controller 314 to switch in block 310. As indicated above with regard to method 200, the truncation time for channel k+1 time can be updated by adding the time difference $S_k$ to the initially allocated truncation time T/K for channel k+1. In other words the truncation time for channel k+1 is $S_k$+T/K. Thereafter, blocks 308-312 can be successively repeated for different channels until all of the channels within the set K have been processed and a decision with regard to whether a channel is occupied or unused can be made for each channel. For example, the repetition of blocks can be performed with the effect that the occupancy of channels in set K is determined as discussed above with regard to method 200.

It should be understood that an effect of system/method 300 and system 200 is that, for each channel within the set K, an estimated cost associated with falsely determining that the selected channel is occupied and with falsely determining that the selected channel is unused is minimized. For example, the exemplary methods and systems described herein are configured such that the costs $c_0^{(k)}$ and $c_1^{(k)}$ in equation (5) are minimized.

To illustrate distinctive aspects of the sequentially added truncation embodiments discussed above, other potential truncation approaches are described herein below.

Figure 4:
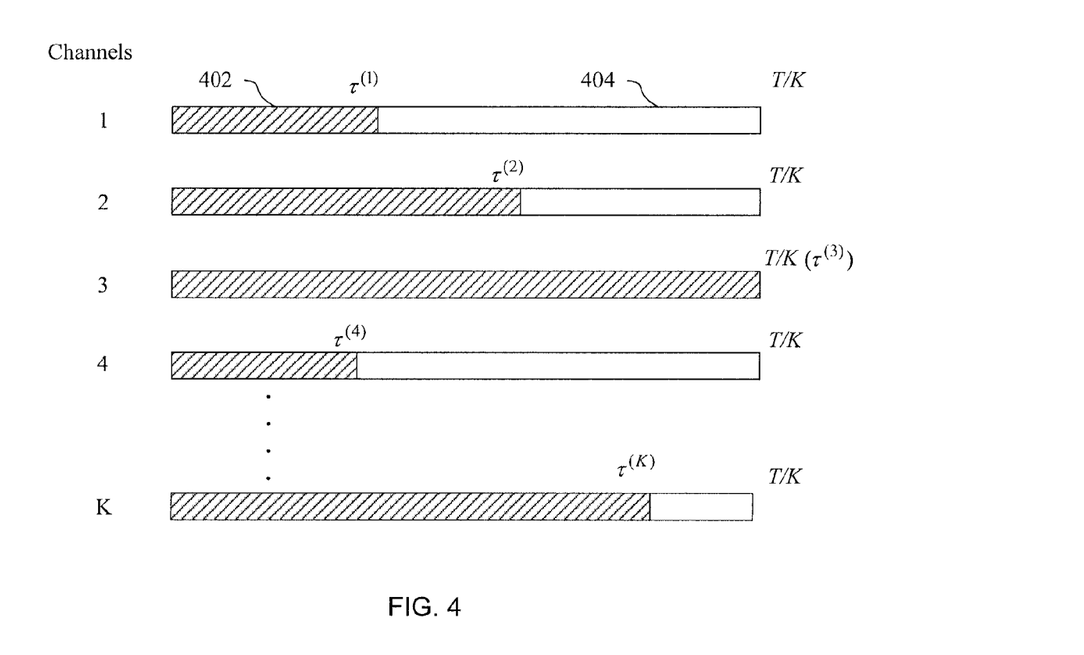
FIG. 4 is a diagram illustrating a sequential detection process that applies a uniform truncation approach.

For example, in a uniform truncation approach, detection for each channel is constrained to be terminated within a period of time T/K, as illustrated in FIG. 4. That is, the maximal detection time is the same for all channels. In contrast to the sequentially added truncation embodiments, if a channel is detected using detection time 402 that is less than a deadline T/K, the time saved 404 on detecting this channel is not reallocated to the detection of other channels. One advantage of uniform truncation is that it can always guarantee that no random decision will take place in the detection process; however, a disadvantage of uniform truncation is that it does not fully utilize available detection time.

Figure 5:
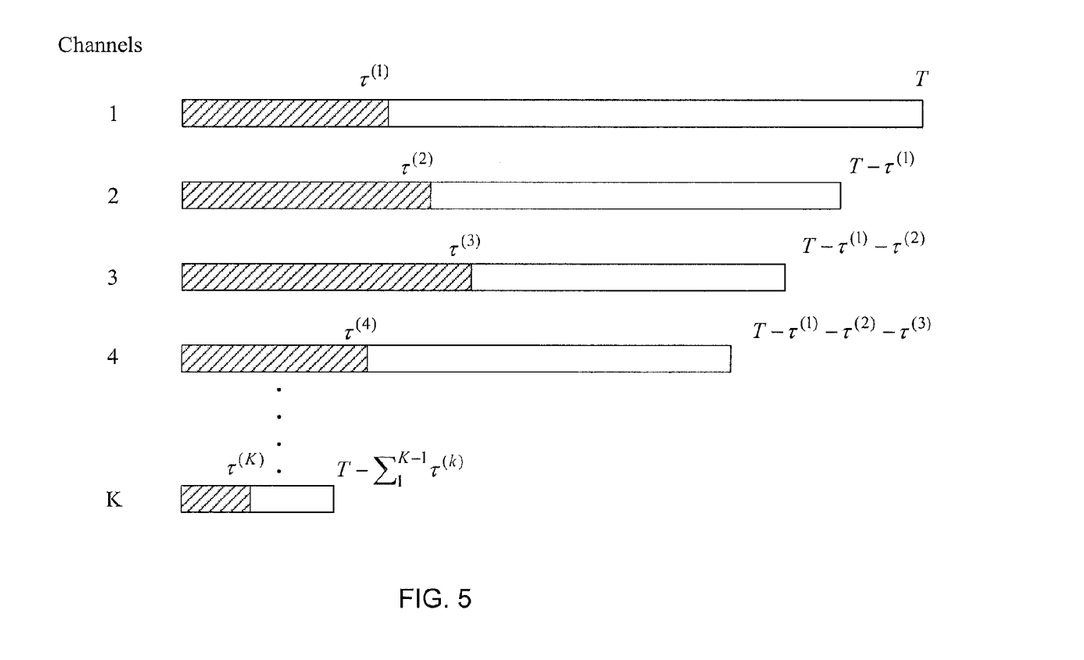
FIG. 5 is a diagram illustrating a sequential detection process that applies a tail truncation approach.

In a tail truncation approach, the entire detection process for all channels are constrained to be completed within a period of time T. Here, available detection time is distributed unevenly among K channels. Specifically, the maximum detection time for the k th channel is $T - \sum_{l=1}^{k-1} \tau^{(l)}$, as shown in FIG. 5. Intuitively, if T is sufficiently large, then it is highly likely that the C-SPRT with tail truncation will be able to scan all the channels, thus being able to achieve a probability similar to that achieved by the non-truncated C-SPRT. If T is quite small, then it is highly likely that the C-SPRT with tail truncation will not have time to finish the detection process for all K channels. In such a case, it is assumed that a random decision (like tossing a coin) will be made for undetected channels, thus incurring high detection errors. This is a major disadvantage of employing C-SPRT with tail truncation.

Figure 6:
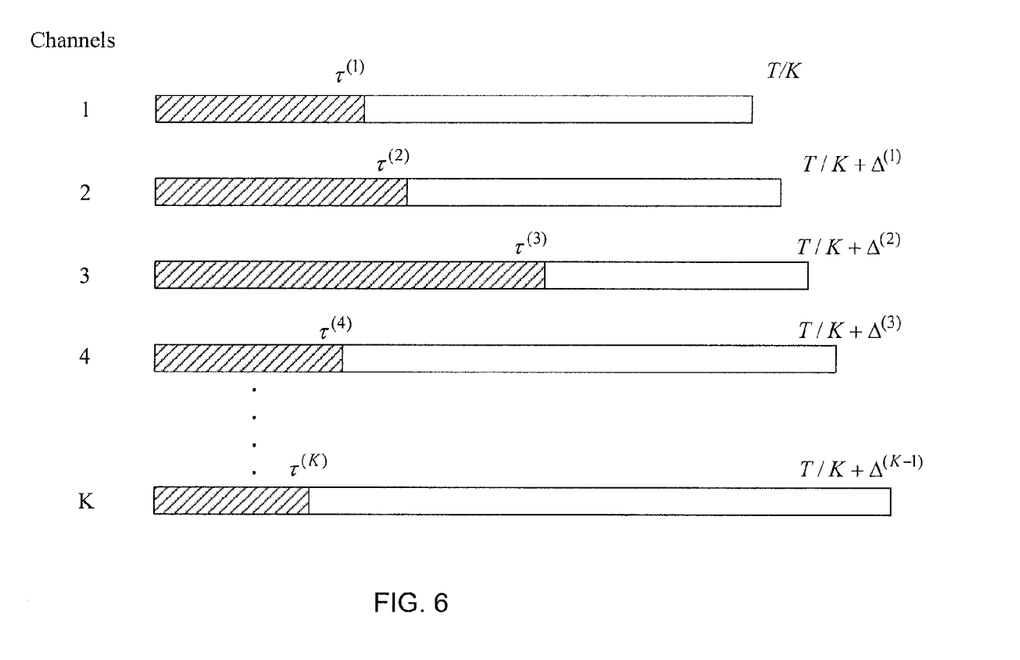
FIG. 6 is a diagram illustrating a sequential detection process that applies a uniformly added truncation approach.

To overcome potential drawbacks of uniform truncation and tail truncation, a uniformly added truncation approach can be employed. As shown in FIG. 6, the maximal detection time is initially set to be T. During the detection process, the detection time saved in a early detection stage is used to extend the maximal detection time for a later detection stage in a uniform manner. That is, the saved detection time is added to the maximum detection time of the undetected channels equally. The maximum detection time for the k th channel is $T/K + \Delta^{(k-1)}$, where $\Delta^{(k)}$ can be recursively computed as $$\Delta^{(0)} = 0, \text{ and } \Delta^{(k)} = \Delta^{(k-1)} + \left\lceil \frac{T/K + \Delta^{(k-1)} - \tau^{(k)}}{K - k} \right\rceil^+,$$

$$k = 1, \ldots, K - 1,$$

where $\lceil x \rceil^+$ denotes $\max\{0, x\}$. As an example, if K=16, T=1600 and $\tau^{(1)}$=10, then after detecting the first channel, 90 sample periods are saved and used to equally extend the maximum detection time for the remaining 15 channels. Thus, the maximum detection time for the remaining channels now is 106. Accordingly, uniformly added truncation can guarantee that no random detection will take place and the detector can fully utilize available detection time. However, because the saved detection time is added to the maximum detection time of the undetected channels in a uniform manner, when T is small, it may lead to unnecessarily large truncation in an early detection stage. The sequentially added truncation approach discussed above addresses this problem.

It can be shown that when T is large, the sequentially added truncation approach performs similarly to other approaches, such as tail truncation. However, when T is relatively small, it can be shown that the sequentially added truncation approach performs best among all other approaches discussed above. In particular, the sequentially added truncation has low false-alarm probability $P_{FA}^{(k)}$, low miss-detection probability $P_{MD}^{(k)}$ and a low average sample number (i.e., the average number of samples used per channel to make an occupancy decision).

It should be understood that embodiments described herein above may be entirely hardware or including both hardware and software elements. In a preferred embodiment, the present invention is implemented in hardware and software, which includes but is not limited to firmware, resident software, microcode, etc.

In addition, embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Having described preferred embodiments of a systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for detecting unused channels for a multi-channel cognitive radio system comprising:
   processing a selected channel within a set of channels in the cognitive radio system by applying a sequential detection process to determine whether the selected channel is occupied by another user;
   determining a time difference between the time at which the sequential detection process for the selected channel is completed and a truncation time allocated for completing the sequential detection process for the selected channel; and repeating the processing and determining steps on other selected channels until all channels within the set of channels have been processed to detect which of the channels of the set are unused, wherein the sequential detection process for an other selected channel employs a truncation time for completing the sequential detection process for the other selected channel that is the sum of the time difference determined for a most recently processed channel and a truncation time initially allocated for completing the sequential detection process for the other selected channel.

2. The method of claim 1, wherein the processing further comprises:
   determining a test statistic based on signals received on the selected channel, an upper boundary parameter and a lower boundary parameter for the selected channel.

3. The method of claim 2, wherein the processing further comprises:
   determining whether the selected channel is occupied by another user based on a comparison between the test statistic and at least one of the lower and upper boundary parameters.

4. The method of claim 3, wherein the selected channel is determined to be occupied by another user if the test statistic exceeds the upper boundary parameter.

5. The method of claim 3, wherein the selected channel is determined to be unused if the test statistic is below the lower boundary parameter.

6. The method of claim 3, wherein
   if the test statistic is between the lower and upper boundary parameters, the processing further comprises collecting an additional sample, updating the test statistic based on the additional sample and repeating the comparison.

7. The method of claim 3, wherein the test statistic is the sum of a set of squared values of received signal samples.

8. The method of claim 7, wherein the upper and lower boundary parameters are based on a probability that the sequential detection process falsely determines that the selected channel is occupied and on a probability that the sequential detection process falsely determines that the selected channel is unused.

9. The method of claim 1, wherein the initially allocated truncation time for each of the channels is T/K, wherein T is a timing constraint by which all channels in the set are determined to be occupied or unused and K is the total number of channels in the set.

10. A secondary user receiver apparatus for detecting unused channels in a multi-channel cognitive radio system comprising:
    a receiver configured to tune to selected channels within a set of channels in the cognitive radio system; and
    a truncated sequential detection module configured to process a selected channel within the set of channels by applying a sequential detection process to determine whether the selected channel is occupied by another user and configured to determine a time difference between the time at which the sequential detection process for the selected channel is completed and a truncation time allocated for completing the sequential detection process for the selected channel,
    wherein the truncated sequential detection module is further configured to repeat the processing on and determining a time difference for other selected channels until all channels within the set of channels have been processed to detect which of the channels of the set are unused, wherein the truncated sequential detection module employs a truncation time for completing the sequential detection process for an other selected channel that is the sum of the time difference determined for a most recently processed channel and a truncation time initially allocated for completing the sequential detection process for the other selected channel.

11. The apparatus of claim 10, wherein the truncated sequential detection module is further configured to determine a test statistic based on signals received on the selected channel, an upper boundary parameter and a lower boundary parameter for the selected channel and is further configured to determine whether the selected channel is occupied by another user based on a comparison between the test statistic and at least one of the lower and upper boundary parameters.

12. A system for detecting unused channels for a multi-channel cognitive radio system comprising:
    a receiver configured to extract samples from selected channels within a set of channels in the cognitive radio system;
    a truncated sequential detection processing module configured to process samples from a selected channel within the set of channels by applying a sequential detection process to determine whether the selected channel is occupied by another user; and
    a truncation time determination module configured to determine a time difference between the time at which the sequential detection process for the selected channel is completed and a truncation time allocated for completing the sequential detection process for the selected channel,
    wherein the truncated sequential detection processing module and the truncation time determination module are configured to repeat the processing and determining, respectively, on other selected channels until all channels within the set of channels have been processed to detect which of the channels of the set are unused, and
    wherein the truncated sequential detection processing module employs a truncation time for completing the sequential detection process for an other selected channel that is provided by the truncation time determination module and is the sum of the time difference determined for a most recently processed channel and the truncation time initially allocated for completing the sequential detection process for the other selected channel.

13. The system of claim 12, wherein the truncated sequential detection processing module is further configured to determine a test statistic based on samples received on the selected channel, an upper boundary parameter and a lower boundary parameter for the selected channel.

14. The system of claim 13, wherein the truncated sequential detection processing module is further configured to determine whether the selected channel is occupied by another user based on a comparison between the test statistic and at least one of the lower and upper boundary parameters.

15. The system of claim 14, wherein the truncated sequential detection processing module is further configured to determine that the selected channel is occupied by another user if the test statistic exceeds the upper boundary parameter.

16. The system of claim 14, wherein the truncated sequential detection processing module is further configured to determine that the selected channel is unused if the test statistic is below the lower boundary parameter.

17. The system of claim 14, wherein, if the test statistic is between the lower and upper boundary parameters, the truncated sequential detection processing module is further configured to direct the collection of an additional sample, update the test statistic based on the additional sample and repeat the comparison.

18. The system of claim 14, wherein the test statistic is the sum of a set of squared values of received signal samples.

19. The system of claim 18, wherein the upper and lower boundary parameters are based on a probability that the sequential detection process falsely determines that the selected channel is occupied and on a probability that the sequential detection process falsely determines that the selected channel is unused.

20. The system of claim 12, wherein the initially allocated truncation time for each of the channels is T/K, wherein T is a timing constraint by which all channels in the set are determined to be occupied or unused and K is the total number of channels in the set.

* * * * *